8748X
H. Gordon,
Reciprocating Saw Mill.
Patented Apr. 8, 1835.
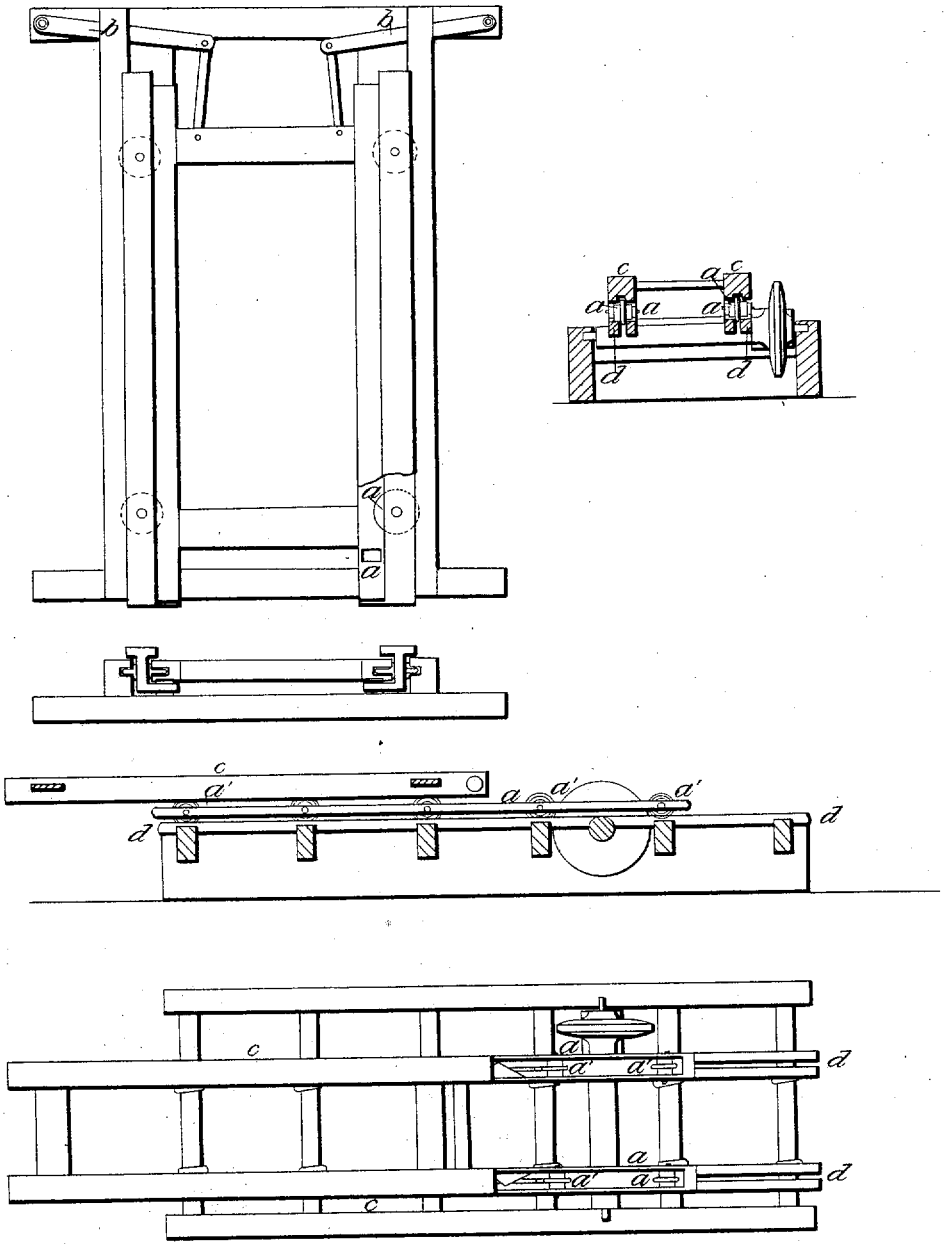
AM. PHOTO-LITHO. CO. N.Y. (OSBORNE'S PROCESS)

8748X April 8, 1835
April 8. 1835

Henry Gordon, of Liberty Township, Pennsylvania

Letters Patent.

The schedule referred to in these Letters Patent and make part of the same, containing a description in the words of said Henry Gordon himself of his improvement in the saw mill carriage To all to whom it may concern, Be it known that I Henry Gordon of Liberty Township, Adams County, Pennsylvania, have invented an improvement in the saw mill carriage by means whereof it is made to move with less friction than here to fore; which invention is applicable also to sliding Bridges as well as to other parts of Machinery of various kinds in which there is a similar traversing motion and I do hereby declare that the following is a true and exact description thereof I make friction rollers which are so constructed and arranged that they serve at the same time to lessen friction and to check the tendence to lateral motion in a saw mill carriage, sliding bridge, or other similar article For this purpose I make any required number of rollers which turn upon pins or rods that pass through them & are fixed into the parallel cheeks or strips of wood in such a way that the rollers will turn with perfect freedom, these rollers have their peripheries projecting above and below the cheeks, so that when placed upon a platform or straight surface they will touch it, and that a saw mill carriage or other similar article placed upon them will rest its whole weight upon the rollers — In order to check the tenden to lateral motion I sometimes form a projecting fillet round the middle of each roller and make a groove along the way

8748X and also in the under side of the Carriage
below the carriage ^ adapted to receive the above named fillet
Instead of a fillet, I sometimes turn a groove in the middle
of each roller and form a fillet or tongue upon the lower side
of the carriage and the up side of the ways, which tongue fits
into the groove formed around the rollers. ^Rollers of this kind may be
made of hard wood cast iron or other material of sufficient
strength, . I have said that this invention is applicable
to parts of machinery other than saw mill carriages and
sliding Bridges, and I will here particularly mention that
I contemplate applying it between a saw mill frame and
the fender posts, In this case the rollers and the cheeks
between which they are placed will be sustained by a
segment or arm above them vibrating upon a centre and
moved by the motion of the saw frame in such a way as to
correspond precisely with the motion of the rollers,
What I claim as my invention is the application
of friction rollers formed as herein described, for the purpose
of checking the tendency of lateral motion in saw mill
carriages, sliding Bridges and other similar structures
and also the application of friction rollers either with
or without grooves, and fillets to saw mill frames for the
purpose described such rollers not being fixed either
into the saw frames, or fender posts, but working up and
down between them, Witnesses
Saml. McKinney
C. F. Buxtenstein Henry Gordon Exd.
M.G.C.

(540 word